United States Patent [19]

Chen-Hsiung

[11] 4,291,836

[45] Sep. 29, 1981

[54] INTERMITTENT WATER-SUPPLY SYSTEM

[76] Inventor: Wu Chen-Hsiung, No. 3, Alley 5, La. 10, Tung-Ho East St., Sec. 2, Taipei, Taiwan

[21] Appl. No.: 87,346

[22] Filed: Oct. 23, 1979

[51] Int. Cl.³ ............................................. F04F 10/00
[52] U.S. Cl. ..................................... 239/37; 47/48.5; 137/132; 137/141; 137/142; 137/147; 137/397; 137/426; 239/68; 239/271
[58] Field of Search ................... 47/48.5; 137/132, 135, 137/136, 141, 142, 144, 147, 397, 426; 239/37, 67, 68, 337, 340, 271, 566

[56] References Cited

U.S. PATENT DOCUMENTS 3,216,663 11/1965 Frampton et al. ............... 137/132 X

FOREIGN PATENT DOCUMENTS 434853 10/1967 Switzerland ..................... 47/48.5

Primary Examiner—Gerald A. Michalsky
Attorney, Agent, or Firm—Thompson, Birch, Gauthier & Samuels

[57] ABSTRACT

Apparatus for intermittently supplying a predetermined quantity of water at regular, predetermined intervals comprising: a water tank for accumulating and storing water; water feeding means and inlet valve means; float-actuated valve means within said water tank; a down pipe connected to said water tank and terminating in a tapered tube; a siphon tube from said water tank terminating in a tapered tube which extends together with the tapered tube of said down pipe into a venturi outlet; and, an ejector tube extending downwardly from said venturi outlet.

10 Claims, 2 Drawing Figures

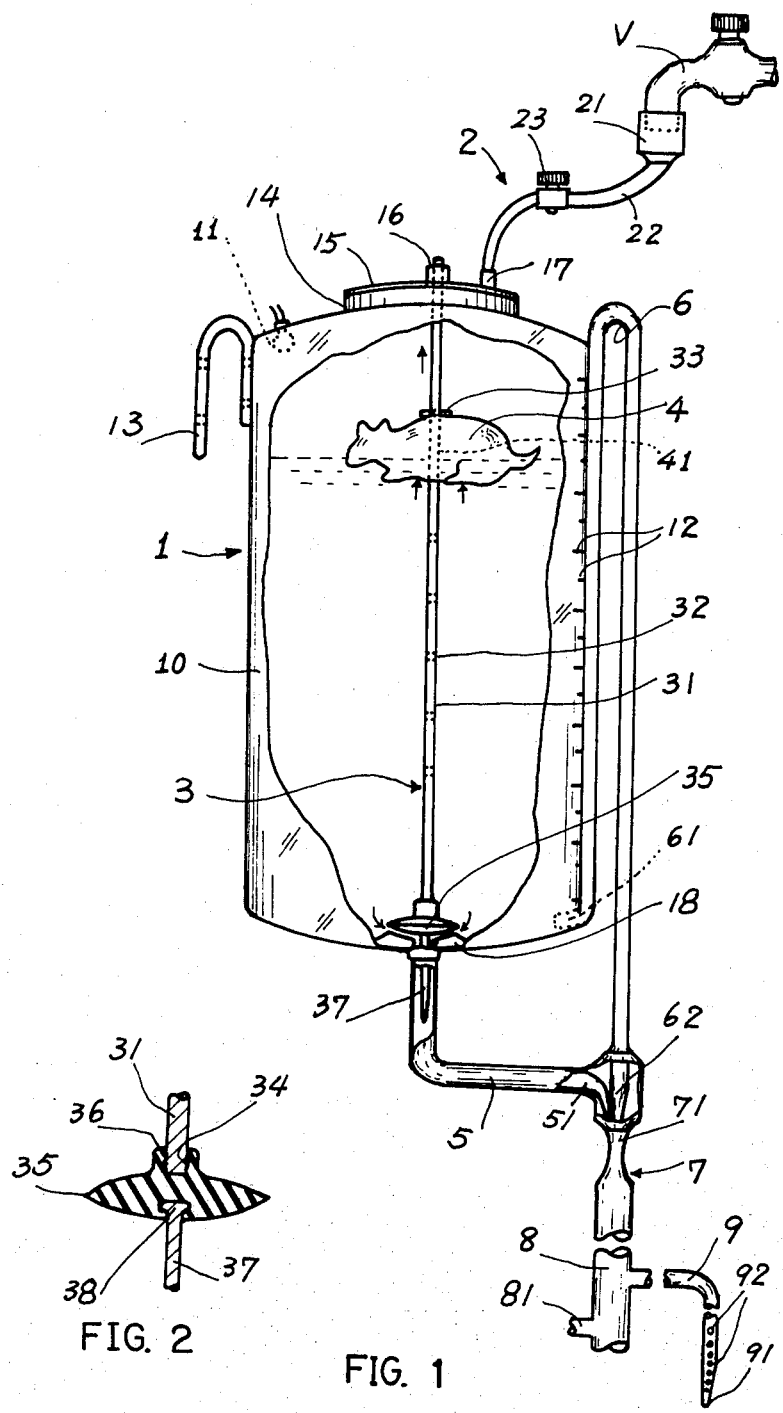

INTERMITTENT WATER-SUPPLY SYSTEM

BACKGROUND OF THE INVENTION

The conventional equipment used to spray water for plants includes sprinklers driven by feeding water. Water droplets sprayed from such sprinklers at high pressure may damage the flowers or weak plants in the garden.

Use of portable sprayers or cans to supply water for plants or flowers can be heavy and tiring work. The manual method for water supply may also involve high labor costs. Such methods are unscientific in modern horticulture.

For other uses such as automatic water distribution for a poultry farm, the water may be supplied by an electrically controlled method. However, the electric power may increase the production cost and maintenance problems in the electric system may also be encountered.

SUMMARY OF THE INVENTION

The object of the present invention is to provide an intermittent water-supply system wherein a water tank is filled at a pre-adjusted rate and will be automatically drained in a pre-set time interval.

The main usages of the present invention include:

(a) Automatic water spraying for flower garden or flower pots in fixed time interval and in fixed quantity;

(b) Providing water for poultry automatically and periodically;

(c) Automatic flushing in a pre-set time interval for public toilets.

BRIEF DESCRIPTION OF THE DRAWING

FIG. 1 is a partial cut-a-way diagram of the intermittent water-supply system in accordance with the present invention.

FIG. 2 is a blow-up sectional view of the float-actuated valve mechanism of this invention.

DESCRIPTION OF THE PREFERRED EMBODIMENT

As shown in FIG. 1, the present invention comprises a water tank 1, a water feeding means 2, a float-actuated valve 3, a float 4, a down pipe 5, a siphon tube 6, an ejector tube 7, a header 8 and several distributor tubes 9.

Said water tank 1 comprises a substantially transparent tank 10 in combination with a lamp 11 attached thereto to enrich the ornamental effect or for lighting use. Alongside the tank, scale 12 is provided on the tank wall to indicate the water level stored therein. A bracket 13 is fixed on said tank so as to facilitate mounting on a wall or other frame. Extension 14 is formed atop the tank and a cover 15 is provided to cap said extension. A vent pipe 16 is centrally located on the top cover. A connector 17 is used to connect the water feeding means 2 which consists of adaptor 21 which is engaged with inlet valve V, hose 22 and regulator 23 which is used to adjust the water feeding rate. Said float-actuated valve 3 comprises a stem 31 which is drilled with several pin holes 32 so as to insert pin 33. Referring now to FIG. 2, said stem 31 is threaded on its lowest end 34 to engage with the female thread 36 of valve disc 35. A guide rod 37 is fixed under said valve disc 35 by inserting the rod head 38 into bottom of disc 35 to restrict the vertical movement of stem 31 within the down pipe 5.

A hollow float 4 contains a vertical hole which is partitioned and separated from the hollow portion. Said float may be shaped as mouse as shown in FIG. 1 or as any other animal shape to enrich the users' interest or for ornamental effects.

Under the tank, a down pipe 5 is provided which terminates in a tapered tube 51. A siphon tube 6 is provided on one side of the tank shell. The water inlet portion 61 of siphon 6 extends almost to the inner bottom of tank 1. The outlet of siphon 6 terminates in a tapered tube 62 which extends together with tapered tube 51 into a venturi outlet 71 of ejector tube 7.

A header 8 having several branches 81 is connected to the expansion pipe of ejector tube 7. Several distributor tubes 9 are respectively connected to the branches 81 of said header 8. Each distributor tube 9 may be tapered to form a tip 91 which is drilled with several holes 92. Such distributor tubes 9 may be inserted into the soil in flower pots by means of tips 91. The distributor tubes having holes 92 may be inserted into soil deeply or shallowly such that the holes 92 are more or less elevated over the soil so as to adjust the water rate for final use.

Water is led from valve V and feeding means 2 into tank 1 by adjusting the regulator 23 at a fixed feeding rate. The water level in the tank will rise and, with it float 4 will raise along stem 31. The location of pin 33 may be adjusted along stem 31 so as to adjust the total water quantity in the tank ready for drainage. Said float 4 will push pin 33 and stem 31 upwards so as to lift valve disc 35 away from valve seat 18. Water will then rapidly flow through down pipe 5 into ejector tube 7.

As the water level is lowered, the float will also drop so that the stem 31 together with valve disc 35 will soon fall by gravity to again seal the valve seat 18 and stop water from flowing through down pipe 5.

During the flow of water through down pipe 5 into ejector tube 7, however, air within said siphon tube 6 will be sucked into venturi outlet 71 of ejector tube 7 through tapered tube 62 so that a vacuum will be formed within venturi zone 71 of ejector tube 7. Air admitted to the tank through vent 16 will exert a downward force on the water in the tank and create a siphon effect in siphon tube 6. Water from the tank will then supply water through header 8 and distributor tubes 9.

The fixed water feeding rate must be less than one half of the water drainage rate through the siphon tube. Also, the bottom of the tank must be at least 10 cm above the highest point of the distributor tubes. Of course, the bending portion of siphon tube 6 should be higher than the height of the tank 10.

After the tank has been emptied through siphon tube 6 and the water level is reduced below the inlet portion 61, air will enter the siphon tube 6 to destroy the vacuum therein. Feed water continuously flowing into tank 1 will refill the tank gradually. Then, another cycle of water draining will occur automatically and periodically thereafter.

The valve disc 35 of the present invention may be made from rubber. The guide rod 37 is used in the present invention to restrict the vertical movement of stem 31 together with vent tube 16 wherein the upper portion of stem 31 is inserted and restricted.

I claim:

1. Apparatus for intermittently supplying a predetermined quantity of water at regular, predetermined intervals comprising:
   (a) a water tank for accumulating and storing water including an air vent in the top of said tank and an outlet in the bottom of said tank, said outlet comprising outlet valve means slidably mounted on a guide rod such that said outlet may be alternatively opened and sealed;
   (b) water feeding means and inlet valve means for filling said water tank at a constant, predetermined rate of flow;
   (c) float-actuated valve means within said water tank comprising a stem slidably mounted in a substantially vertical position within said water tank and drilled with a plurality of pin holes at varying heights so as to accommodate a readily-removable insert pin, said stem being threadably formed on its lower end so as to engage said outlet valve means, and a hollow float having a vertical hole partitioned from said hollow portion slidably mounted through said hole on said stem;
   (d) a down pipe connected to said water tank outlet and terminating in a tapered tube;
   (e) a siphon tube comprising an inlet stem inside said water tank terminating in an open end just above the bottom of said tank and an outlet stem outside said water tank terminating in a tapered tube which extends together with the tapered tube of said down pipe into a venturi outlet, wherein the U-shaped portion of said siphon tube passes over the top of the wall of said water tank; and,
   (f) an ejector tube extending downwardly from said venturi outlet.

2. The apparatus of claim 1 wherein said ejector tube is connected to a plurality of distributor tubes for distributing water to a plurality of locations.

3. The apparatus of claim 2 wherein the tips of said distributor tubes are tapered and drilled with a plurality of holes.

4. The apparatus of claim 1 wherein the uppermost portion of said siphon tube extends above the top of said water tank.

5. The apparatus of claim 1 wherein said outlet valve means comprises a mated valve disc and valve seat.

6. The apparatus of claim 1 wherein the top of said stem passes through said air vent in the top of said water tank.

7. The apparatus of claim 1 wherein said predetermined rate of water flow is less than one-half the rate of water drainage from said water tank.

8. The apparatus of claim 1 wherein said water tank includes a scale to indicate the water level in said tank.

9. The apparatus of claim 1 wherein said water tank is transparent and includes illumination apparatus for ornamental effect.

10. The apparatus of claim 1 additionally including bracket means for mounting said apparatus.

* * * * *